No. 881,778. PATENTED MAR. 10, 1908.
C. R. DEAN.
CULTIVATOR.
APPLICATION FILED NOV. 14, 1907.

Witnesses.

Inventor
C. R. Dean,
By R. A. R. Lacey, Attorneys

UNITED STATES PATENT OFFICE.

CLARENCE R. DEAN, OF GLEN ELDER, KANSAS.

CULTIVATOR.

No. 881,778.　　　　Specification of Letters Patent.　　Patented March 10, 1908.

Application filed November 14, 1907. Serial No. 402,214.

*To all whom it may concern:*

Be it known that I, CLARENCE R. DEAN, citizen of the United States, residing at Glen Elder, in the county of Mitchell and State of Kansas, have invented certain new and useful Improvements in Cultivators, of which the following is a specification.

This invention relates to agricultural implements, and more particularly to cultivators designed for listing and provided with means for dropping seed, the seed dropping mechanism deriving motion from a ground wheel through the intervention of a tumbling-rod.

Figure 1:
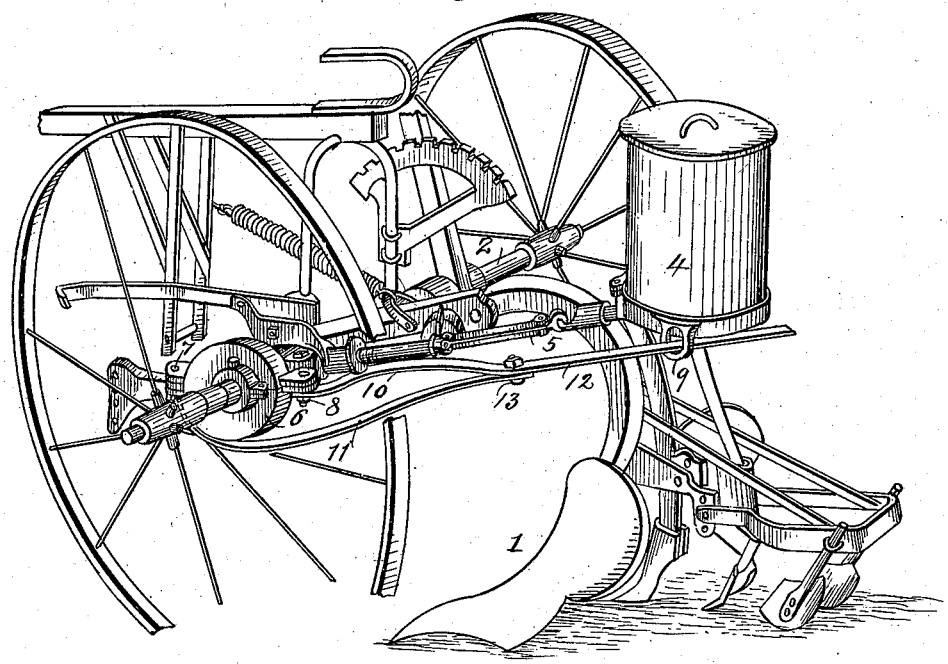
Figure 2:
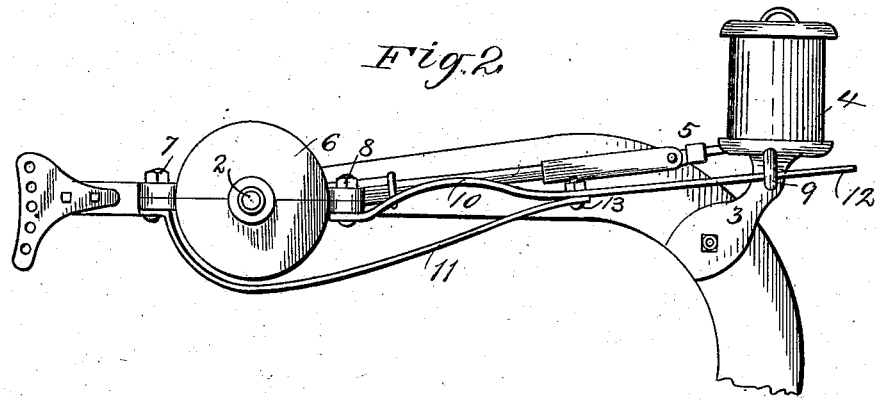

In operating an implement of the character aforesaid considerable difficulty has been experienced because of the bending or breaking of the tumbling-rod, and this invention is designed to overcome these difficulties and to brace and strengthen the framework, thereby preventing breaking of castings or the bending of the tumbling-rod, these results being accomplished by the means hereinafter described and claimed and shown in the accompanying drawings forming a part of the specifications, in which:

Figure 1 is a detail view in perspective of a lister cultivator embodying the invention; and Fig. 2 is a detail view in elevation of a portion of the implement showing clearly the application of the invention.

Corresponding and like parts are referred to in the following description and indicated in both views of the drawings by the same reference characters.

The cultivator illustrated is of ordinary construction, such as devised for listing and dropping seed. The plow 1 for opening the soil is coupled to the axle 2 of the implement in the usual way and is provided with a bracket 3 upon which is mounted a hopper 4 for receiving the grain to be dropped and the mechanism for effecting discharge of the grain or seed at proper intervals. The tumbling-rod 5 is of ordinary construction and arrangement and is adapted to transmit motion from the ground wheel to the seed dropping mechanism, said tumbling-rod being geared to the seed dropping mechanism and to the part from which power is derived in any well known manner. The gear case 6 fitted to the axle and inclosing the gearing between the tumbling-rod and the part connected with the ground wheel so as to rotate therewith, is composed of upper and lower sections separable on a horizontal line and having front and rear ears to receive the bolts or fastenings 7 and 8. The parts herein referred to are of well known construction and arrangement and are illustrated to demonstrate the application of the invention.

An eye 9 is formed or provided at one side of the bracket 3 near the upper end thereof and receives the rear end of a brace which is forked at its front end, one of the fork members 10 having connection with the rear portion of the gear case 6, and the fork member 11 having connection with the front portion of said gear case. The fork members 10 and 11 may form a part of the rear portion 12 of the brace, or may be separate therefrom and connected thereto in any substantial way. As shown, the parts 10 and 12 are of integral formation, whereas the part 11 is separate from and secured to the part 10 and 12 by means of a bolt or fastening 13. The two fork members 10 and 11 curve symmetrically in opposite directions so as the better to resist the strain. The rear portion 12 of the brace operates in the eye 9, as the plow is adjusted to meet varying conditions. The bolt or fastening 8 connecting the rear ends of the gear case sections also secures the front end of the fork member 10 of the brace thereto and the bolt or fastening 7 connecting the front ends of the gear case sections also secures the front end of the fork member 11 of the brace to said gear case. Removal or loosening of the fastenings 7 and 8 admits of the sections of the gear case, as well as the fork members of the brace, being separated.

Having thus described the invention, what is claimed as new is:

1. In a lister cultivator of the type disclosed, comprising a bracket supporting a hopper, a gear case mounted upon the axle, a tumbling-rod transmitting motion from the ground wheel to the seed dropping mechanism of the hopper, an eye at one side of the aforesaid bracket, and a brace having its rear portion fitted in said eye and having its front portion forked and connected to the said gear case at opposite points.

2. In a lister cultivator, comprising a plow, a bracket projected upward from the plow beam and supporting a hopper, a tumbling-rod for transmitting motion from a ground wheel to the seed dropping mechanism coöperating with said hopper, and a sectional gear case housing the gearing connecting the tumbling-rod with the rotatable part connected with a ground wheel, an eye at one side of the aforementioned bracket, a brace having its rear portion loosely fitted in said eye and having its front portion forked, and fastenings securing the sections of the gear case and the front ends of the respective fork members of said brace.

In testimony whereof I affix my signature in presence of two witnesses.

CLARENCE R. DEAN. [L. S.]

Witnesses:
W. F. HUBAKER,
C. A. BROKAW.